(12) United States Patent
Legrand et al.

(10) Patent No.: US 10,005,873 B2
(45) Date of Patent: Jun. 26, 2018

(54) STRUCTURED BLOCK COPOLYMERS

(71) Applicant: KEMIRA OYJ, Helsinki (FI)

(72) Inventors: Sacha Legrand, Helsinki (FI); Marco Polverari, Quebec (CA); Rosa Carceller, Espoo (FI)

(73) Assignee: KEMIRA OYJ, Helsinki (FI)

( * ) Notice: Subject to any disclaimer, the term of this patent is extended or adjusted under 35 U.S.C. 154(b) by 0 days. days.

(21) Appl. No.: 15/121,558

(22) PCT Filed: Feb. 27, 2015

(86) PCT No.: PCT/EP2015/054158
§ 371 (c)(1),
(2) Date: Aug. 25, 2016

(87) PCT Pub. No.: WO2015/128471
PCT Pub. Date: Sep. 3, 2015

(65) Prior Publication Data
US 2016/0369030 A1    Dec. 22, 2016

(30) Foreign Application Priority Data

Feb. 28, 2014 (FI) .................................. 20145199

(51) Int. Cl.
| | | |
|---|---|---|
| *D21H 17/34* | (2006.01) |
| *C08F 293/00* | (2006.01) |
| *C02F 1/56* | (2006.01) |
| *C02F 11/14* | (2006.01) |
| *C08F 295/00* | (2006.01) |
| *D21H 17/37* | (2006.01) |
| *D21H 21/06* | (2006.01) |
| *D21H 21/10* | (2006.01) |
| *C08F 8/12* | (2006.01) |
| *C02F 1/52* | (2006.01) |
| *C08F 226/02* | (2006.01) |

(52) U.S. Cl.
CPC .......... *C08F 293/00* (2013.01); *C02F 1/5272* (2013.01); *C02F 1/56* (2013.01); *C02F 11/14* (2013.01); *C08F 8/12* (2013.01); *C08F 295/00* (2013.01); *D21H 17/34* (2013.01); *D21H 17/37* (2013.01); *D21H 17/375* (2013.01); *D21H 21/06* (2013.01); *D21H 21/10* (2013.01); *C08F 226/02* (2013.01)

(58) Field of Classification Search
CPC ........ C02F 1/56; C02F 11/14; C08F 2931/00; C08F 295/00; C08F 226/02; C08F 8/12; C08F 293/00; D21H 17/34; D21H 17/37; D21H 17/375; D21H 2/11
USPC ....................................................... 162/164.4
See application file for complete search history.

(56) References Cited

U.S. PATENT DOCUMENTS

| | | |
|---|---|---|
| 3,812,095 A | 5/1974 | Sheppard et al. |
| 4,808,683 A | 2/1989 | Itagaki et al. |
| 2004/0143039 A1 | 7/2004 | Hollomon et al. |
| 2004/0182533 A1 | 9/2004 | Blum et al. |

FOREIGN PATENT DOCUMENTS

| | | |
|---|---|---|
| DE | 198 58 708 A1 | 6/2000 |
| EP | 0 472 352 A1 | 2/1992 |

OTHER PUBLICATIONS

International Search Report, dated May 15, 2015, from corresponding PCT application.
FI Search Report, dated Nov. 28, 2014, from corresponding FI application.

*Primary Examiner* — Mark Halpern
(74) *Attorney, Agent, or Firm* — Young & Thompson

(57) ABSTRACT

New polyvinylamide and/or acryl acid-based copolymers. The new structured block copolymers are based on the block copolymerization of N-vinyl formamide (NVF) with other monomers by using a bifunctional initiator. Further, a method of preparing the structured block copolymer is provided, and especially a method wherein the NVF-based block is at least partially hydrolyzed to obtain PVAm. Also the use of the new structured block copolymers in sludge dewatering and in papermaking processes is disclosed.

6 Claims, 6 Drawing Sheets

STRUCTURED BLOCK COPOLYMERS

This Application is a 371 of PCT/EP2015/054158 filed on 27 Feb. 2015

FIELD OF THE INVENTION

The invention relates to a structured block copolymer. More particularly, the invention relates to a structured block copolymer based on the block copolymerization of N-vinyl formamide (NVF) with other monomers by using a bifunctional initiator. Further, the present invention concerns a method of preparing the structured block copolymer. The invention also relates to the use of the structured block copolymer in sludge dewatering and in papermaking processes.

BACKGROUND OF THE INVENTION

Various flocculants including polymeric flocculants have been used in order to flocculate and dewater sludge generated from municipal sewage and industrial wastewater. A method for flocculating and precipitating solid contents by adding a polymer flocculant to waste water has been widely adopted. In these methods, a process of adding a dilute aqueous solution of the polymer flocculant to waste water or sludge is typical. Flocculants are added to facilitate the settling of suspended particles in a solution. Flocculants facilitate the agglomeration and, therefore, make larger floccules. These tend to settle down due to gravitational force. Flocculants try to bridge the molecules forming clumps. For example, an anionic flocculant will react with a positively charge polymer and will adsorb those particles.

In recent years, sludge generated from municipal sewage and industrial wastewater has been increasing because of changes in the recent living environment. Furthermore, the properties of the sludge are becoming worse. Due to increasing demand of cationic polymer flocculants in these application there is a need to develop new cationic block copolymers designed for cost-effective solids/liquid separation processes.

In addition to the use as polymeric flocculants, water-soluble polymers, in particular, high-molecular weight water-soluble polymers are used in various technical fields such as retention aids, paper strength agents, and thickeners.

Such water-soluble polymers include homopolymers prepared by polymerizing an anionic monomer such as an acrylate or a methacrylate, a cationic monomer such as dimethylaminoethyl(meth)acrylate quaternary salt, or a non-ionic monomer such as (meth)acrylamide and also include ionic polymers such as copolymers of an anionic monomer and a nonionic monomer; copolymers of a cationic monomer and a nonionic monomer; and copolymers of a cationic monomer, an anionic monomer, and a nonionic monomer.

Conventionally, a cationic polymer flocculant is used for dewatering sewage sludge and the like, and also as a retention aid in paper making. On the market there exists quite a broad range of polyacrylamide flocculants used in the water treatment and as sludge dewatering polymers. However, the known flocculants consisting of acrylamide-cationic monomers based copolymers have limited performance at high pH due to low resistance to hydrolysis and low stability under high shear conditions.

With traditional polyacrylamide flocculants, under certain circumstances (high pH value), the amide group present in the polymer backbone can react with their neighboring cationic ester groups. A cationic copolymer is then transformed to a non-ionic or even anionic copolymer with inexistent or poor dewatering activities. Therefore there is a need to find more stable acrylamide-based copolymers.

The cationic polymers are also widely used in the paper industry. They are often referred to as fixatives, drainage aids, and/or retention aids, and they are added to the pulp before or during paper production. The term "fixing" generally implies the binding of small particles to pulp fibers. Fixatives build up agglomerates with colloidal material in the water phase and attach them onto fibers so that they end up in the final paper sheet. It is known that the existing cationic polymers do not work well under all circumstances. Therefore there is a constant need to find better performing polymers for use in the paper making processes or at least find new alternatives for the existing ones.

BRIEF DESCRIPTION OF THE INVENTION

An object of the present invention is thus to provide a new block copolymer, which could be used in sludge dewatering or in paper making processes. The objects of the invention are achieved by a structured block copolymer which is characterized by what is stated in the independent claim 1. The preferred embodiments of the invention are disclosed in the dependent claims.

The structured block copolymer of the present invention contains two different homopolymer blocks. These two different homopolymer blocks are made up of different polymerized monomers, wherein the monomers are (i) N-vinylformamide (NVF), and (ii) acrylic acid, acrylamide or water-soluble derivative thereof, and the two different homopolymer blocks are linked together with a molecular spacer derived from a bifunctional initiator used for the polymerization of said homopolymer blocks.

Polymerization of NVF gives an NVF-based homopolymer, which is herein referred to as P(NVF). The structured block copolymer containing P(NVF) provides the opportunity to hydrolyze them to polyvinylamines (PVAm). Polyvinylamines are more environmentally friendly polymers than acrylamide polymers, and thus, the resulting structured block copolymer containing a block, wherein at least part of the P(NVF) is hydrolyzed to PVAm is "greener" polymer, which is an additional advantage of the present invention. Thus, the invention provides new structured copolymers containing polyvinylamines, which are prepared from the monomer NVF as a replacement to conventionally used acrylamide. Such new NVF-based polyvinylamines are more "acrylamide free", and consequently greener polymer compared to traditional products on the market.

Further, the structured block copolymers of the present invention can be made more stable in high pH conditions than conventional random copolymers of the same monomers. For example, some traditional flocculants based on acrylamide and cationic monomer have displayed limited activities in water treatment and as sludge dewatering polymers. This is due to their low stability in high shear conditions such as highly alkaline conditions. In these polymers the amide group present in the polymer backbone acts as a catalyst and can therefore react with the neighbouring cationic ester groups. This intramolecular reaction results in dramatic modification of the copolymer backbone, with possibly complete losses of cationic groups in the polymer. A cationic copolymer is then consequently transformed to a non-ionic or even anionic copolymer with nonexistent dewatering activity. As a result, such acrylamide-based copolymers are not suitable to be used as flocculants, because of intolerance to high alkaline conditions.

These intramolecular reactions can be avoided by using a bifunctional initiator (initiator bearing two functionalities) for the polymerization. This bifunctional initiator works as a molecular spacer between the acrylamide and the cationic groups in the copolymer backbone. The bifunctional initiator can be used to polymerize the two homopolymer blocks of the copolymer. With such a molecular spacer between the two blocks, under highly basic conditions, the acrylamide group of the poly(acrylamide) block in the copolymer cannot react anymore with the cationic group of the other homopolymer.

Random copolymers of an acrylamide and a cationic monomer have also the disadvantage that the charges of the cationic monomer are randomly spread over the copolymer backbone. In the present invention the structured block copolymer contains two homopolymers, wherefrom the other one is the partially (or completely) hydrolysed poly(NVF-PVAm) cationic homopolymer and the other block is for example poly(acrylamide) homopolymer. In the cationic homopolymer all the charges are concentrated into one block, which makes the polymer more efficient in the suggested end uses, such as flocculant, sludge dewatering polymer, fixative, drainage aid, or retention aid.

Accordingly the present invention provides as a first aspect a structured block copolymer, which contains two different homopolymer blocks, which are made up of different polymerized monomers, wherein the monomers are (i) N-vinylformamide (NVF), and (ii) acrylic acid, acrylamide or water-soluble derivatives thereof.

In a second aspect the invention provides a method for preparing a structured block copolymer, wherein two different monomers are polymerized via a two-step copolymerization. In said method a compound having the formula (I)

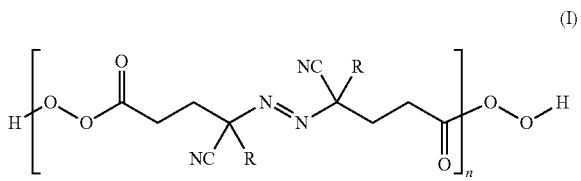

(I)

wherein R is H, or $C_{1-5}$-alkyl, and n is from 1 to 10, is used as a bifunctional initiator during the polymerization. One step of the copolymerization consists of preparing the NVF-based homopolymer. The other step is the formation of homopolymer block of acrylic acid, acrylamide or water soluble derivatives thereof.

In a third aspect the invention provides an intermediate product characterized in that it contains N-vinylformamide (NVF) homopolymer block, which is polymerized by using a bifunctional initiator having the formula (I), wherein R is H, or $C_{1-5}$-alkyl, and n=1 to 10.

In another aspect, the invention provides a product characterized by containing a partially hydrolyzed poly(NVF-PVAm) cationic homopolymer block, prepared after a selective hydrolysis step.

In a still another aspect the invention provides the use of the structured block copolymer according to the invention in paper making processes and/or in sludge dewatering.

BRIEF DESCRIPTION OF THE DRAWINGS

In the following the invention will be described in greater detail by means of preferred embodiments with reference to the attached [accompany-ing] drawings, in which.

DETAILED DESCRIPTION OF THE INVENTION

Figure 1:
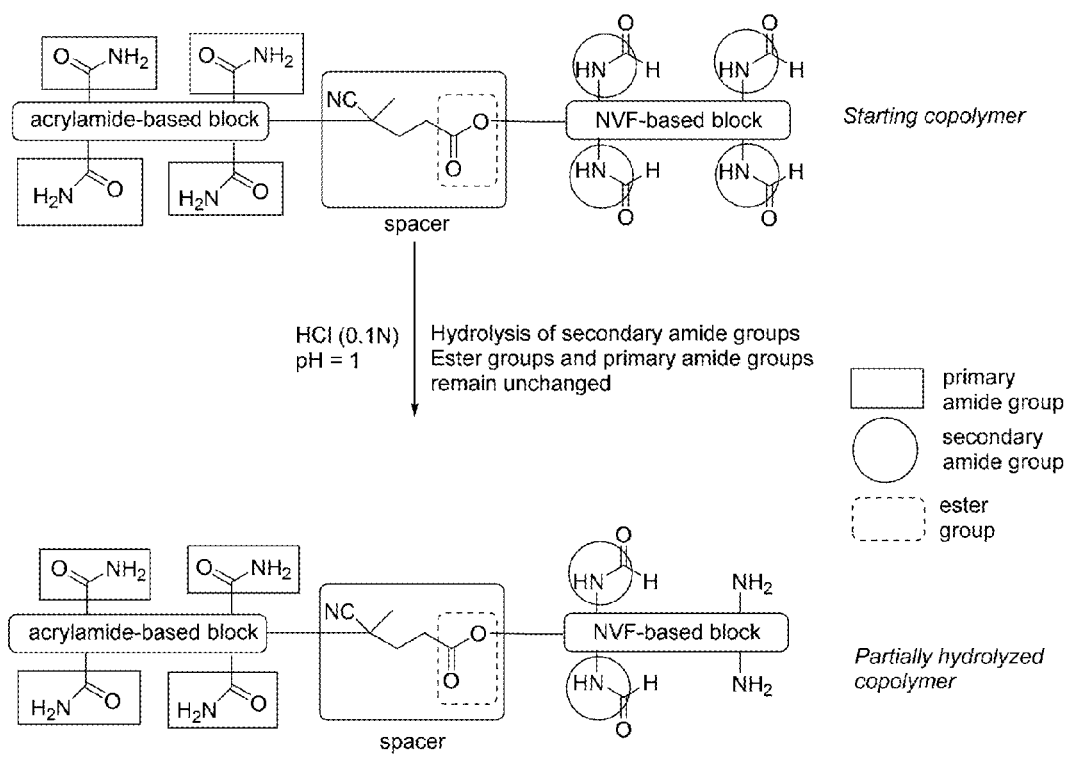
FIG. 1 illustrates a schematic representation of the selective hydrolysis of NVF-acrylamide based structured block copolymer using acidic conditions.

The present invention relates to a structured block copolymer based on the block copolymerization of N-vinyl formamide (NVF) with other monomers by using a bifunctional initiator, which also later acts as a molecular spacer in polymer backbone. The bifunctional initiator used is known and it has been used to form copolymers, but not from N-vinyl formamide. Thus, the preparation of a block copolymer with a homopolymer unit derived from N-vinyl formamide connected by a molecular spacer to another homopolymer unit provides new copolymers having structured block structure. These new structured block copolymers contain two different homopolymer blocks, which are made up of different polymerized monomers, wherein the monomers are (i) N-vinylformamide (NVF), and (ii) acrylic acid, acrylamide or water-soluble derivatives thereof.

The general structure of the new structured block copolymers is the following:

[first block]-[spacer]-[second block]

The first block is a homopolymer made of NVF monomers and the second block is a homopolymer made of a monomer selected from a group comprising acrylic acid, acrylamide and water-soluble derivatives thereof.

Polymerization of NVF gives an NVF homopolymer, which is herein referred to as P(NVF) or NVF-based block. The structured block copolymer containing P(NVF) may be hydrolyzed to polyvinylamine (PVAm). Polyvinylamines are environmentally friendly polymers, and thus, also the resulting structured block copolymer containing a block, wherein at least part of the P(NVF) is hydrolysed to PVAm is more environmentally friendly polymer than for example a block copolymer, where acryl amide is used as a monomer instead of NVF.

The water-soluble derivatives of acrylic acid and acrylamide can be selected from a group comprising methacrylamide, N-methylolacrylamide, N-methylolmethacrylamide, methacrylic acid, methyl acrylate, ethyl acrylate, butyl acrylate, 2-ethylhexyl acrylate, lauryl acrylate, stearyl acrylate, 2-hydroxyethyl acrylate, 2-hydroxypropyl acrylate, methyl methacrylate, ethyl methacrylate, butyl methacrylate, 2-ethylhexyl methacrylate, lauryl methacrylate, stearyl methacrylate, 2-hydroxyethyl methacrylate, 2-hydroxypropyl methacrylate, glycidyl methacrylate, 2-acrylamide-2-methylpropanesulfonic acid, dimethylaminoethyl acrylate, diethylaminoethyl acrylate, dimethylaminoethyl methacrylate, diethylaminoethyl methacrylate, N,N-dimethylaminopropylacrylamide, N,N-dimethylaminopropylmethacrylamide, 2-N-morpholinoethyl methacrylate, 2-diisopropylaminoethyl methacrylate, 1-(2-methacryloyloxyethyl) imidazole, 2-(tert-butylamino)ethyl methacrylate, N,N-dimethylaminoethyl acrylamide, N-[2-(dimethylamino)-1,1-dimethylethyl]acrylamide, and their methyl chloride or methyl sulfate quaternaries or mixtures thereof; or methacrylamidopropyltrimethylammonium chloride (MAPTAC), dimethylaminoethylacrylate methyl chloride (Q9), diallyldimethylammonium chloride (DADMAC).

According to one embodiment of the present invention the structured block copolymers are polymerized by using a bifunctional initiator having the formula (I)

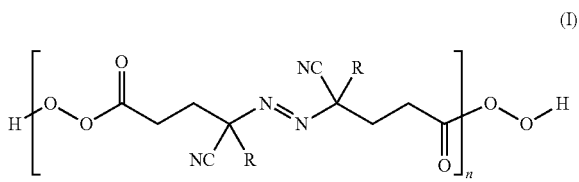

wherein R is H, or $C_{1-5}$-alkyl, and n is from 1 to 10.

Typical monomer ratio (in mol) between the first and second blocks is from 1:1 to 9:1, preferably from 1:1 to 4:1. The molecular weight of the first block is typically from 1 000 to 21 000, whereas the molecular weight of the final copolymer might be from 48 000 to several millions, but preferably from 100 000 to 1 200 000.

As an example of the polymerization method according to the invention, the NVF-acrylamide based structured block copolymers may be prepared in a two-step synthetic procedure using a bifunctional initiator. A schematic description of the polymerization process is described below (Scheme A). In the first step of the process, NVF (1) is reacted with the bifunctional initiator at low temperature (T=0-5° C.) in presence of $Na_2S_2O_5$ giving the intermediate 2. At this temperature, only the peroxide groups of the initiator react, while the azo group remains intact for the second step of the reaction. Then, acrylamide (3) can be added to the reaction mixture, which was warmed at higher temperature (about 65° C.). The azo group of the initiator decomposed and was reacted with the double bond of acrylamide, yielding the targeted structured block copolymer (4). The details regarding a typical procedure are presented in the examples.

Scheme A: preparation of a NVF-acrylamide based structure block copolymer

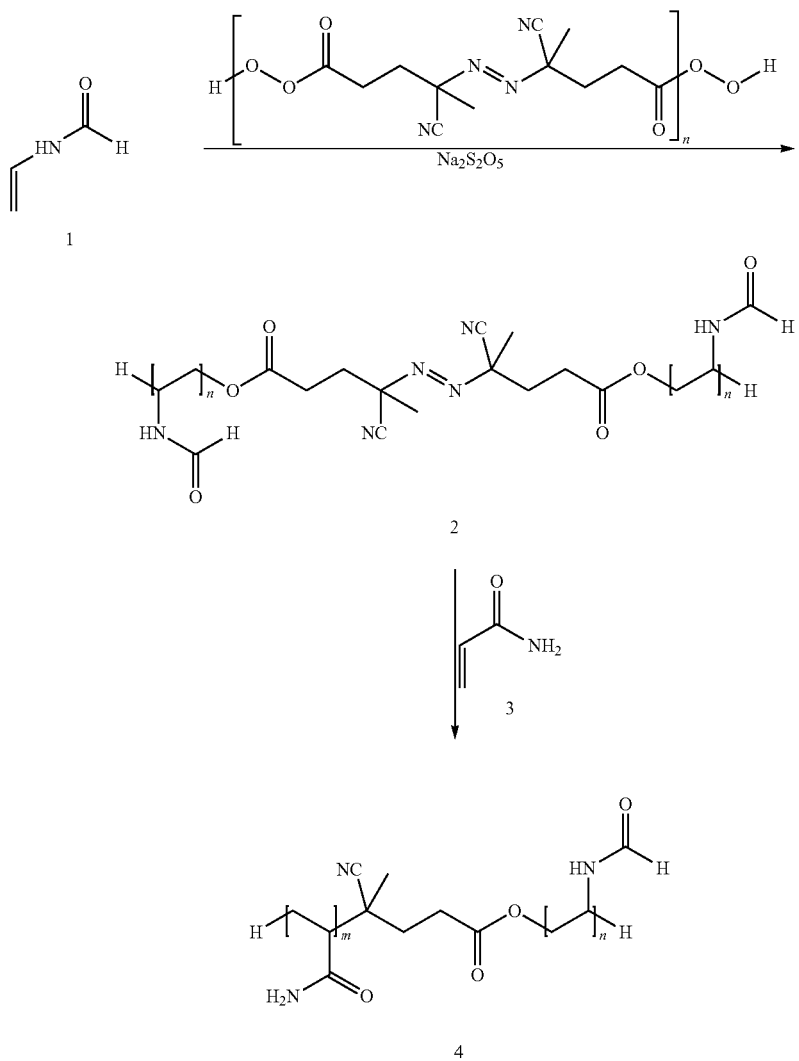

In an embodiment, the structured block copolymer of the present invention contains an P(NVF) block, wherein at least part of the formamide groups have been hydrolyzed to amino groups. The formula of hydrolysis of the formamide groups may vary between 0.5% and 100%. In an embodiment of the present invention the degree of hydrolysis of the formamide groups is at least 10%, but it may as well be at least 20%, 30%, 40%, 50%, 60%, 70%, 80% or 90% depending on the application where the polymer is used. Preferably the degree of hydrolysis is between 50-100%.

The present invention also provides a new intermediate product for the preparation of structured block copolymers. This intermediate product contains N-vinylformamide (NVF) homopolymer block, which is polymerized by using a bifunctional initiator having the formula (I)

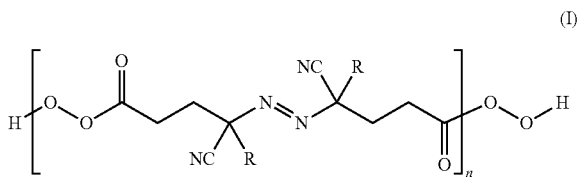

(I)

wherein R is H, or $C_{1-5}$-alkyl, and n=1 to 10.

Another aspect of the present invention is the method for preparing a structured block copolymer. In this method two different monomers are polymerized via a two-step copolymerization, and a compound having the above formula (I), wherein R is H, or $C_{1-5}$-alkyl, and n is from 1 to 10, is used as a bifunctional initiator during the polymerization. From the two steps of the copolymerization one step is for forming homopolymer blocks of N-vinylformamide (NVF), and it the other step is for forming homopolymer blocks of acrylic acid, acrylamide or water-soluble derivatives thereof. Possible water-soluble derivatives of acrylic acid and acrylamide are the ones listed above.

As mentioned, one of the advantages of the present invention is the possibility to hydrolyze the formamide groups (secondary amide-like group) of the P(NVF) block. The challenge of this hydrolysis step consists of reacting only one group (secondary amide) without affecting the other groups (primary amides and esters). The NVF-based structured block copolymers according to the invention may contain different reactive chemical groups: secondary amide from the NVF-based block, primary amide from for example an acrylamide-based block or ester from for example a Q9-based block (depending on which monomer is used as the second monomer), and also an ester from the bifunctional initiator.

It has now been discovered that the selectively hydrolysis of the NVF-based structured block copolymers can be done by an acidic hydrolysis of such a block copolymer (e.g. a structured block copolymer of NVF-spacer-acrylamide). Based on both NMR spectroscopy and GPC measurements, the hydrolysis provides amino groups to the P(NVF) block without hydrolyzing the primary amide and ester moieties.

Accordingly, in an embodiment of the invention, the method further contains a step wherein the vinylformamide groups of the formed structured block copolymer are at least partially selectively hydrolyzed to vinylamine groups. In an embodiment the selective hydrolysis is made by using a strong acid and having pH between 0.5 and 6, preferably pH is between 1 and 2.5. The strong acid used for the hydrolysis is preferably hydrochloric acid (HCl) and it may be optionally used together with sodium dithionite or a as buffer solution. The buffer solution used may be a hydrochloric acid/potassium chloride buffer solution (pH=1 at T=20° C.).

A schematic representation of selective hydrolysis of NVF-acrylamide based structured block copolymer using acidic conditions is shown in Scheme 1, which in illustrated in FIG. 1.

In one embodiment, the second homopolymer is polymerized using dimethylaminoethylacrylate methyl chloride (Q9) as the monomer. Q9 contains an ester group. As mentioned above also the hydrolysis of a NVF-Q9 based block copolymer provides amino groups to the P(NVF) block without hydrolyzing the ester groups, which are present in the Q9-based block and in the spacer.

Figure 2:
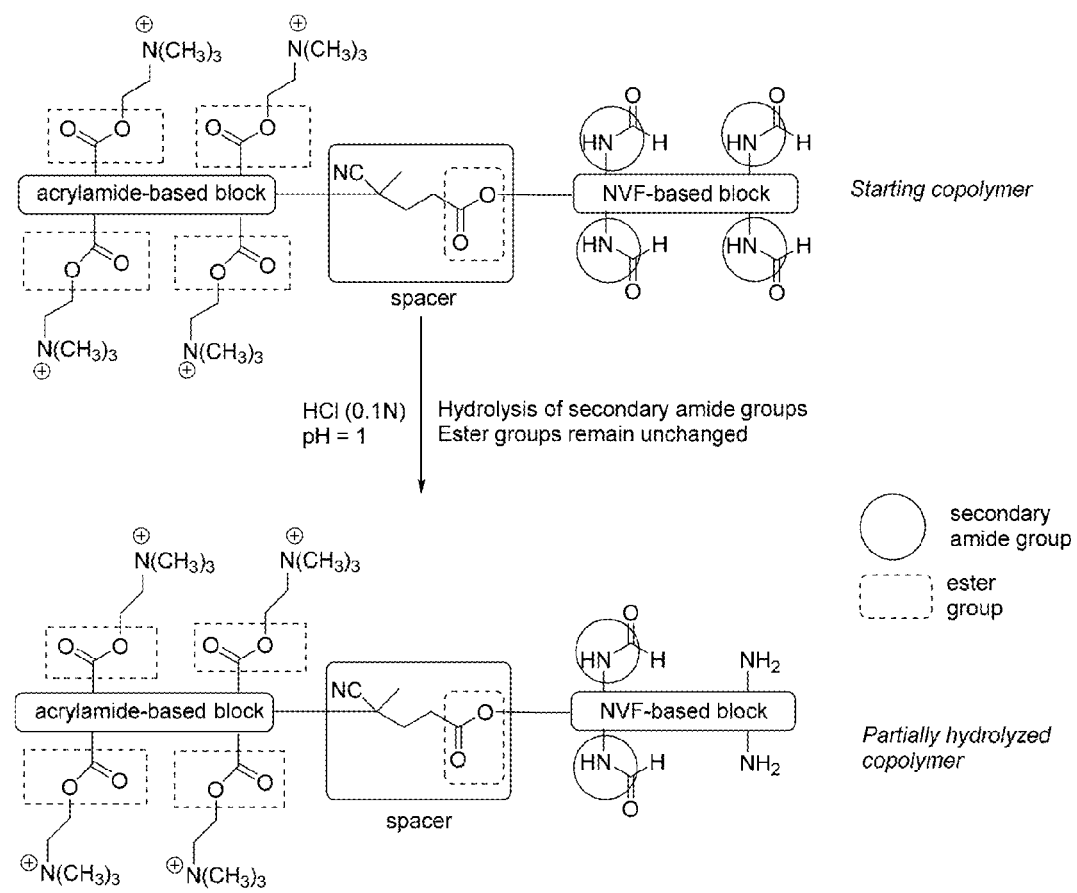
FIG. 2 illustrates a schematic representation of the selective hydrolysis of Q9-NVF based structured block copolymer using acidic conditions.

A schematic representation of selective hydrolysis of Q9-NVF based structured block copolymer using acidic conditions is shown in Scheme 2, which is illustrated in FIG. 2.

In addition to selective hydrolysis under acidic conditions, it has been discovered that the selectively hydrolysis of the NVF-based structured block copolymers can also be done by caustic hydrolysis i.e. under alkaline conditions. Also caustic hydrolysis provides primary amino groups to the P(NVF) block without hydrolyzing the primary amides and esters. In an embodiment the hydrolysis is made by using a strong base and having pH between 8 and 14, preferably pH is between 10 and 12. The strong base is preferably sodium hydroxide (NaOH).

Figure 3:
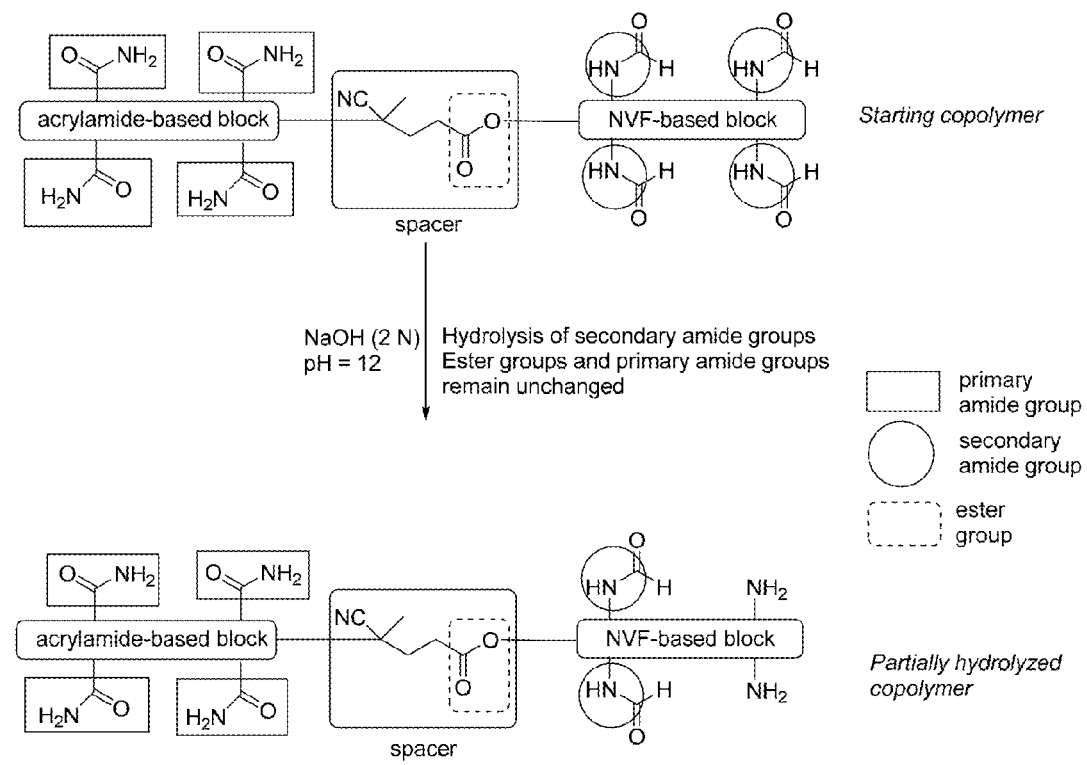
FIG. 3 illustrates a schematic representation of the hydrolysis of NVF-acrylamide based structured block copolymer using alkaline conditions.

A schematic representation of hydrolysis of NVF-acrylamide based structured block copolymer using alkaline conditions is shown in Scheme 3, which in illustrated in FIG. 3.

The structured block copolymers obtained after the polymerization and after the possible hydrolysis are in the form of a water solution. After the polymerization the solid content of the solution may vary depending on reaction conditions used. The solid content may be for example from 1 to 20%, and is typically between 5 to 15%. The obtained water solution may be dried so that final polymer may be in solid form or as concentrated solution. The polymer may be also formulated in the form of emulsion or dispersion.

The structured block copolymer according to the present invention may be used in many applications, but it is especially designed to be used in paper making processes and in sludge dewatering.

Wastewater discharged from industrial waste treatment plants must be low in suspended solids, COD, BOD and TOC. Chemical Oxygen Demand (COD) is the total measurement of all chemicals in the water that can be oxidized; Biochemical Oxygen Demand (BOD) measures the amount of food (or organic carbons) that bacteria can oxidize; and Total Organic Carbon (TOC) is the measurement of organic carbons. The structured block copolymers according to the present invention work to increase the particle size and settling rate of suspended material in wastewater. Removal of suspended solids, while benefit in itself, can also cause a decrease in BOD, TOC, and COD. Likewise, industrial sludges must be treated to remove as much water as possible in preparation for transportation and/or final disposal. The structured block copolymer according to the present invention will modify the sludges during the dewatering operation and provide high water release from the sludge at low usage rate and cost. Since liquid sludges cannot typically be safely and inexpensively disposed, the structured block copolymer according to the present invention helps in environmental compliance by properly and consistently aiding in water removal.

Accordingly, an aspect of the invention is the use of the structured block copolymer of the present invention in sludge dewatering. The structured block copolymer can be used as a sludge dewatering polymer or as a flocculant.

Another aspect of the invention is the use of the structured block copolymer of the present invention in paper making processes. In these processes the structured block copolymer of the present invention may act as a fixative or retention agent.

It is apparent to a person skilled in the art that as technology advanced, the basic idea of the invention can be implemented in various ways. The invention and its embodiments are therefore not restricted to the above examples, but they may vary within the scope of the claims.

EXAMPLES

Example 1—Polymerization of NVF and Acrylamide Based Block Copolymer, and Hydrolysis Under Acidic Conditions A 200 mL multi-necks reactor was equipped with a thermometer, a reflux condenser and a nitrogen inlet. The apparatus was purged constantly with nitrogen. In the reactor, a N-vinylformamide solution (30.7 g of 50% water solution) was mixed with deionized water (100 g), Versenex 80 (2 g; 80% solution). The solution was mixed very well and pH was adjusted to 4.5 with concentrated sulfuric acid. The bifunctional initiator (0.01 g, dissolved in a minimum amount of THF) was added to the previous reaction mixture. After mixing for 10-15 minutes, the reaction mixture was cooled to T=0° C. and $Na_2S_2O_5$ (0.2 g in 20 g of water) was added slowly to the reaction mixture. The temperature was carefully monitored below T=10° C. during addition of $Na_2S_2O_5$. After completion of the addition, the reaction mixture was stirred at T=0° C. overnight (about 16 hours).

Figure 4:
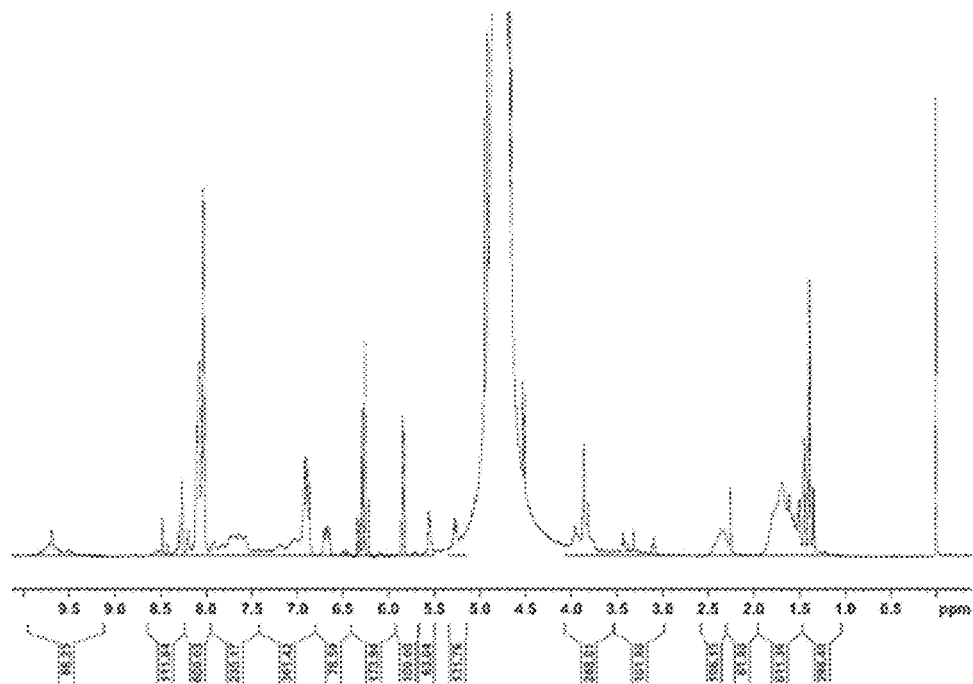
FIG. 4 shows $^1$H NMR spectra of the structured block copolymer before hydrolysis.
Figure 6:
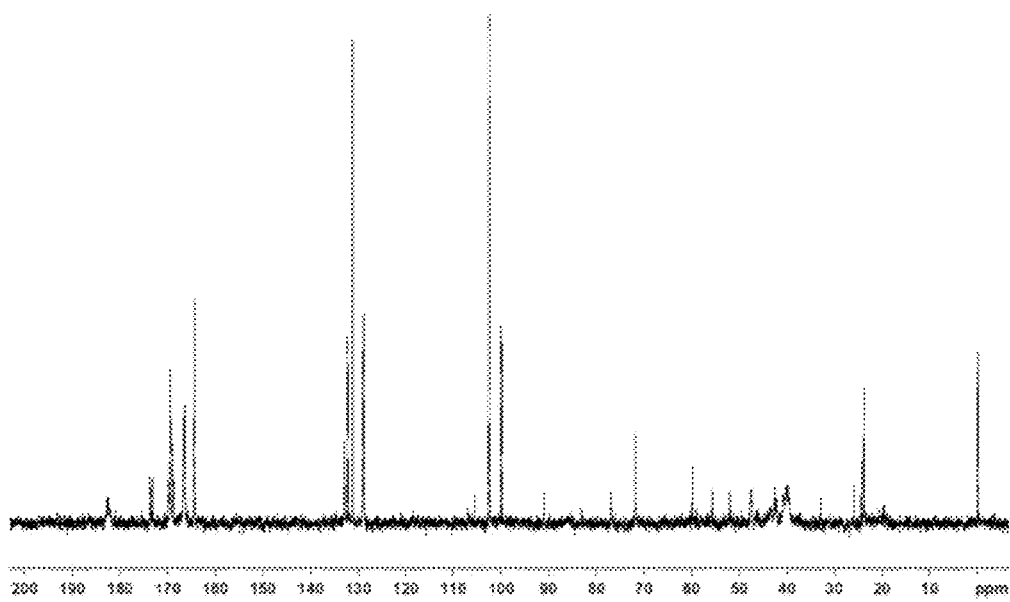
FIG. 6 shows $^{13}$C NMR spectra of the structured block copolymer before hydrolysis.

In the morning, a small amount of acrylamide (2 g in 50% water solution), which was previously acidified to pH=4.5 with concentrated sulfuric acid, was added slowly to the reactor. The reaction mixture was then warmed to T=65° C. Then, the rest of acrylamide (8.2 g, 50% water solution) was pumped slowly to the reaction mixture. When the addition was completed, the reaction mixture was stirred at T=65° C. for additional 24 h. The formed structured block copolymer was then analyzed by $^1H$ and $^{13}C$ NMR, GPC, solid content and viscosity (Brookfield) before the hydrolysis step. The analysis results of the structured block copolymer are shown in Table 1, and the NMR spectras are shown in FIGS. 4 and 6, which are the "before the hydrolysis" spectras.

Solid content (SC): the amount of polymer in solution (%) was determined using a halogen moisture analyzer HR 73 from Metier Todelo and corresponding standard method (T=150° C.).

Viscosity: the viscosity (cP) was determined using a Brookfield Digital Viscometer following the standard instructions (manual M/92-021-P405).

NMR spectra were recorded on spectrometers Bruker Ultra Shield™ 400 (400 MHz for $^1H$ and 100 MHz for $^{13}C$). $D_2O$ was used as solvent and the signal of the solvent as internal standards. Chemical shifts are expressed in ppm and number of protons.

Molecular weight distribution: Mw, Mn and PD were measured using an agilent 1100 series SEC apparatus equipped with a RI detector. Polymers were dissolved in THF before injection. The standards used for the determination of the molecular weight were a series of PEO (polyethylene glycol) with molecular mass (Mw) varying from 430 to 1 015 000.

TABLE 1

Analysis results of the intermediate structured block copolymer

| pH | Solid content (%) | Viscosity (cP) | $M_w$ | $M_n$ | PD |
|---|---|---|---|---|---|
| 5.3 | 7.17 | 95 | 860 050 | 117 600 | 4.9 |

Figure 5:
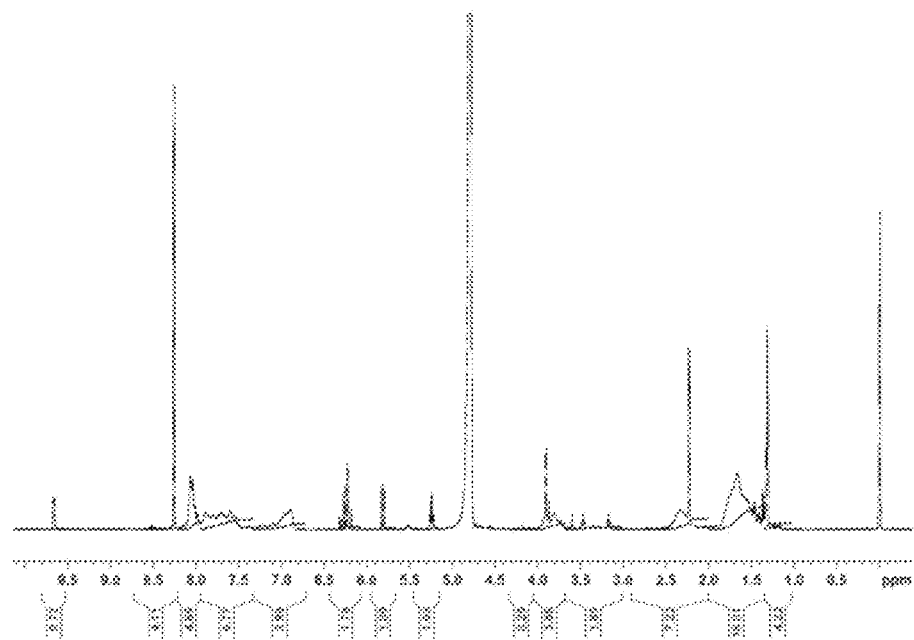
FIG. 5 shows $^1$H NMR spectra of the structured block copolymer after hydrolysis.
Figure 7:
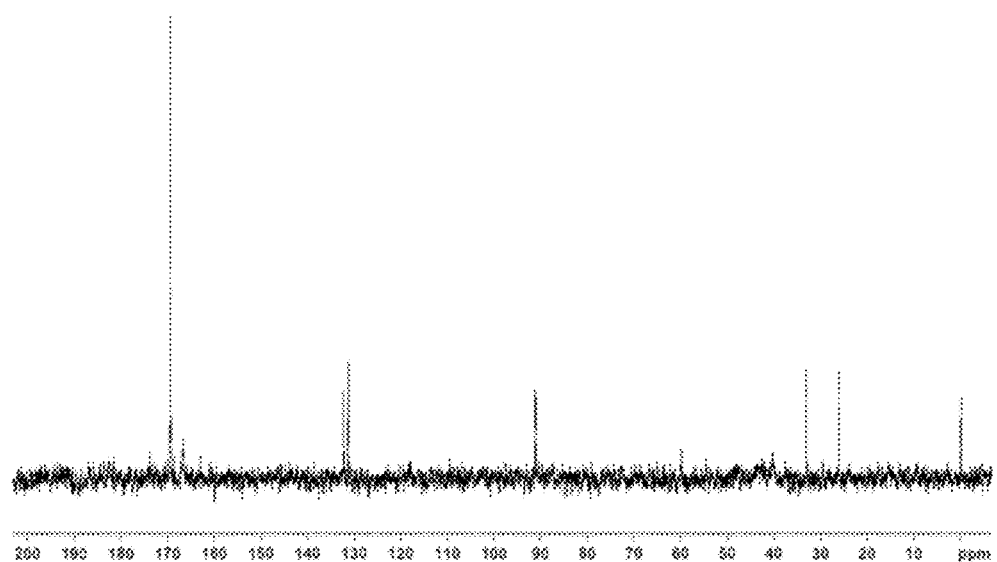
FIG. 7 shows $^{13}$C NMR spectra of the structured block copolymer after hydrolysis.

Under inert atmosphere, HCl solution (0.1 N, 375 mL) was put in a 1 L 3 necks round bottom flask equipped with a reflux condenser. The previous block copolymer to hydrolyze (50 mL aqueous solution) was then added slowly to the HCl solution at room temperature. After completion of the addition, the reaction mixture was homogeneous. Then, the reaction mixture was stirred at T=65° C. for 5 h. Then, the reaction mixture was cooled to room temperature and the final copolymer was analyzed by $^1H$ NMR and $^{13}C$ NMR, GPC, solid content, pH, and viscosity (Brookfield). The analysis results of the final structured block copolymer are shown in Table 2, and the NMR spectras are shown in FIGS. 5 and 7, which are the "after the hydrolysis" spectras.

TABLE 2

Analysis results of the final structured block copolymer

| pH | Solid content (%) | Viscosity (cP) | $M_w$ | $M_n$ | PD |
|---|---|---|---|---|---|
| 2.74 | 1.1 | 1.9 | 666 650 | 183 350 | 3.6 |

Comparison of the NMR spectras before and after hydrolysis shows that the amount of NHCOH groups (NVF-based block) is decreasing after hydrolysis, while the amount of $CONH_2$ groups (acrylamide-based block) is remaining the same. The presence of formic acid after hydrolysis is also noticed, which confirms hydrolysis of NHCOH groups from NVF-based block. By comparing NMR spectra, it can also be noticed that the residual NVF monomer has disappeared after hydrolysis, while residual acrylamide monomer is still present and thus not affecting the hydrolysis conditions.

The copolymer obtained was suitable for use as a fixative as shown in the following Example.

Example 2—Fixative

The structured block copolymer according to Example 1 was tested as fixatives for a coated broke (Test 1). Another structured block copolymer was also prepared according to Example 1, but the amount of acid used for the hydrolysis was half of the amount used in the Example 1, and thus resulted in lower degree of hydrolysis of the final polymer (Test 2). Turbidity was used as a parameter to estimate the fixative properties of these NVF-based structured block copolymers. Turbidity was measured using a Turb 555IR WTW. Measurements were expressed in NTU (nephelometric turbidity units, 90° scattered light measurement). The copolymer of Test 1 significantly decreased the turbidity from 9014.8 NTU to 7487 NTU (dosage 110 g/t, as active contents) and to 6974 NTU (dosage 220 g/t, as active contents). The analogue copolymer (Test 2), which has a lower degree of hydrolysis, decreased the turbidity from 9014.8 NTU to 7130 NTU (dosage 160 g/t, as active contents) and to 5804 NTU (dosage 320 g/t, as active contents). Another comparison test was made with corresponding non-hydrolyzed block copolymer, but it did not show as significant change in turbidity after chemical addition.

From these tests it could be concluded that the copolymer obtained was suitable for use as a fixative and the higher degree of hydrolysis improved the fixative properties.

Example 3—Polymerization of Dimethylaminoethylacrylate Methyl Chloride (Q9) and NVF Based Block Copolymer, and Hydrolysis Under Acidic Conditions A 200 mL multi-necks reactor was equipped with a thermometer, a reflux condenser and a nitrogen inlet. The apparatus was purged constantly with nitrogen. In the reactor, dimethylaminoethylacrylate methyl chloride solution (56 g of 50% water solution) was mixed with deionized water (75 g), Versenex 80 (2 g; 80% solution). The solution was mixed very well and pH was adjusted to 4.5 with concentrated sulfuric acid. The bifunctional initiator (0.075 g, dissolved in a minimum amount of THF) was added to the previous reaction mixture. After mixing for 10-15 minutes, the reaction mixture was cooled to T=0° C. and $Na_2S_2O_5$ (0.2 g in 20 g of water) was added slowly to the reaction mixture. The temperature was carefully monitored below T=10° C. during addition of $Na_2S_2O_5$. After completion of the addition, the reaction mixture was stirred at T=0° C. overnight (about 16 hours).

In the morning, a small amount of N-vinylformamide (4 g in 50% water solution), which was previously acidified to pH=4.5 with concentrated sulfuric acid, was added slowly to the reactor. The reaction mixture was then warmed to T=65° C. Then, the rest of N-vinylformamide (16.4 g, 50% water solution) was pumped slowly to the reaction mixture. When the addition was completed, the reaction mixture was stirred at T=65° C. for additional 24 h. The intermediate structured block copolymer was then analyzed by 1H and 13C NMR, GPC, solid content and viscosity (Brookfield) before the hydrolysis step.

Under inert atmosphere, HCl solution (0.1 N, 230 mL) was put in a 500 mL 3 necks round bottom flask equipped with a reflux condenser. The previous block copolymer to hydrolyze (30 mL aqueous solution) was then added slowly to the HCl solution at room temperature. After completion of the addition, the reaction mixture was homogeneous. Then, the reaction mixture was stirred at T=65° C. for 5 h. Then, the reaction mixture was cooled to room temperature and the final copolymer was analyzed by $^1$H and $^{13}$C NMR, GPC, solid content, viscosity (Brookfield) and charge density.

Example 4—Flocculant

The NVF-Q9-based structured block copolymer obtained from Example 3 was tested as flocculant with a DIP sludge (dry substance 3.9%). The sludge dewatering tests (Poly Test) have been conducted in order to study the performance of new polymers. Filtrate turbidity has been measured as a response parameter. The tested copolymer shows significant decreasing of the filtrate turbidity. Without treatment, the filtrate turbidity was found to be 9999 NTU. After treatment with a NVF-Q9-based structured block copolymer (dosage of 2.5 kg/t), the filtrate turbidity decreased to 1131 NTU, which shows that the copolymer obtained was suitable for use as a flocculant.

Example 5—Fixative, Hydrolysis Under Caustic Conditions

A 200 mL multi-necks reactor was equipped with a thermometer, a reflux condenser and a nitrogen inlet. The apparatus was purged constantly with nitrogen. In the reactor, N-vinylformamide solution (30.7 g of 50% water solution) was mixed with deionized water (100 g), Versenex 80 (2 g; 80% solution). The solution was mixed very well and pH was adjusted to 4.5 with concentrated sulfuric acid. The bifunctional initiator (0.01 g, dissolved in a minimum amount of THF) was added to the previous reaction mixture. After mixing for 10-15 minutes, the reaction mixture was cooled to T=0° C. and $Na_2S_2O_5$ (0.2 g in 20 g of water) was added slowly to the reaction mixture. The temperature was carefully monitored below T=10° C. during addition of $Na_2S_2O_5$. After completion of the addition, the reaction mixture was stirred at T=0° C. overnight (about 16 hours).

In the morning, a few amount of acrylamide (2 g in 50% water solution), which was previously acidified to pH=4.5 with concentrated sulfuric acid, was added slowly to the reactor. The reaction mixture was then warmed to T=65° C. Then, the rest of acrylamide (8.2 g, 50% water solution) was pumped slowly to the reaction mixture. When the addition was completed, the reaction mixture was stirred at T=65° C. for additional 24 h. The final polymer was then analyzed by solid content and viscosity (Brookfield) and charge density.

Under inert atmosphere, NaOH solution (0.1 N, 100 mL) was put in a 250 mL 3 necks round bottom flask equipped with a reflux condenser. The previous block copolymer to hydrolyze (20 mL aqueous solution) was then added slowly to the NaOH solution at room temperature. After completion of the addition, the reaction mixture was homogeneous. Then, the reaction mixture was stirred at T=65° C. for 5 h. Then, the reaction mixture was cooled to room temperature and the final copolymer was analyzed by $^1$H and $^{13}$C NMR, GPC, solid content, viscosity (Brookfield) and charge density.

The copolymer obtained was suitable for use as a fixative.

The invention claimed is:

1. A structured block copolymer comprising two different homopolymer blocks, which are made up of different polymerized monomers, wherein the monomers are
   i. N-vinylformamide (NVF), and
   ii. acrylic acid, acrylamide or water-soluble derivatives thereof,
   and wherein the two different homopolymer blocks are linked together with a molecular spacer derived from a bifunctional initiator used for the polymerization of said homopolymer blocks.

2. The structured block copolymer according to claim 1, wherein the water-soluble derivatives of acrylic acid and acrylamide are selected from a group consisting of methacrylamide, N-methylolacrylamide, N-methylol-methacrylamide, methacrylic acid, methyl acrylate, ethyl acrylate, butyl acrylate, 2-ethylhexyl acrylate, lauryl acrylate, stearyl acrylate, 2-hydroxyethyl acrylate, 2-hydroxypropyl acrylate, methyl methacrylate, ethyl methacrylate, butyl methacrylate, 2-ethylhexyl methacrylate, lauryl methacrylate, stearyl methacrylate, 2-hydroxyethyl methacrylate, 2-hydroxypropyl methacrylate, glycidyl methacrylate, 2-acrylamide-2-methylpropanesulfonic acid, dimethylaminoethyl acrylate, diethylaminoethyl acrylate, dimethylaminoethyl methacrylate, diethylaminoethyl methacrylate, N,N-dimethylaminopropylacrylamide, N,N-dimethylaminopropyl-methacrylamide, 2-N-morpholinoethyl methacrylate, 2-diisopropylaminoethyl methacrylate, 1-(2-methacryloyloxyethyl)

imidazole, 2-(tert-butylamino)ethyl methacrylate, N,N-dimethylaminoethyl acrylamide, N-[2-(dimethylamino)-1,1-dimethylethyl]acrylamide, and their methyl chloride or methyl sulfate quaternaries or mixtures thereof; or methacrylamidopropyltrimethylammonium chloride (MAPTAC), dimethylaminoethylacrylate methyl chloride (Q9), and diallyldimethylammonium chloride (DADMAC).

3. The structured block copolymer according to claim 1, wherein the monomers for the two different homopolymer blocks are
   i. N-vinylformamide (NVF), and
   ii. acrylic acid, methacrylic acid, acrylamide, methacrylamide dimethylaminoethylacrylate methyl chloride, or methacrylamidopropyltrimethylammonium chloride.

4. The structured block copolymer according to claim 1, wherein the bifunctional initiator used for the polymerization has the formula (I)

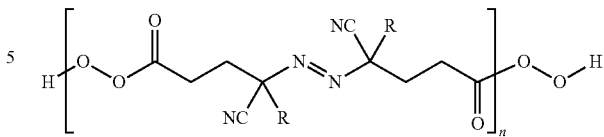

wherein R is H, or $C_{1-5}$-alkyl, and n is from 1 to 10.

5. The structured block copolymer according to claim 1, wherein the formamide groups of the NVF block are at least partially hydrolyzed to amino groups.

6. Method of using the structured block copolymer according to claim 5 in paper making process which comprises adding an effective amount of the structured block copolymer as a fixating agent.

\* \* \* \* \*